(12) United States Patent
Ballantyne et al.

(10) Patent No.: US 6,741,641 B1
(45) Date of Patent: May 25, 2004

(54) METHOD AND APPARATUS FOR MEASURING PARAMETERS OF AN ELECTRICAL SYSTEM

(75) Inventors: Alex Ballantyne, Edinburgh (GB); David Taylor, Edinburgh (GB)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/572,893

(22) Filed: May 18, 2000

(30) Foreign Application Priority Data

May 21, 1999 (GB) ............................................. 9911750

(51) Int. Cl.[7] ............................................. H04B 17/00
(52) U.S. Cl. ...................................... 375/226; 370/252
(58) Field of Search ................................. 375/213, 224, 375/226, 371, 277; 714/700, 799; 370/252

(56) References Cited

U.S. PATENT DOCUMENTS

| | | | | |
|---|---|---|---|---|
| 5,122,732 A | * | 6/1992 | Engeler et al. | 324/76.31 |
| 5,689,449 A | * | 11/1997 | Saramaki et al. | 708/313 |
| 5,754,437 A | | 5/1998 | Blazo | |
| 5,757,652 A | | 5/1998 | Blazo et al. | |
| 6,101,218 A | * | 8/2000 | Nagano | 375/224 |

FOREIGN PATENT DOCUMENTS

| | | |
|---|---|---|
| EP | 0 282 229 A2 | 9/1988 |
| EP | 0 697 774 A1 | 2/1996 |
| GB | 2 312 353 A | 10/1997 |
| JP | 10 178420 | 6/1998 |
| WO | WO97/32392 | 9/1997 |

OTHER PUBLICATIONS

Bregni, S. et al., "Fast Computation of Maximum Time Interval Error by Binary Decomposition," IEEE International Conference on Communications, vol. 3 (Jun. 6, 1999), pp. 1741–1745.

Bregni, S., "Measurement of Maximum Time Interval Error for Telecommunications Clock Stability Characterization, " IEEE Transactions on Instrumentation and Measurement, vol. 45, No. 5 (Oct. 1996), pp. 900–906.

Dobrogowski, A. et al., "Direct Approach to MTIE Calculation," Proceedings of the 1999 Joint Meeting of the European Frequency and Time Forum and the IEEE International Frequency Control Symposium, vol. 2 (Apr. 13, 1999), pp. 1121–1124.

* cited by examiner

*Primary Examiner*—Stephen Chin
*Assistant Examiner*—Kevin Kim (57) ABSTRACT

An electronic system parameter, such as time deviation (TDEV), is measured by reference to an input series of data samples received and processed to produce in real-time first and second time-varying series of measurements for the parameter.

34 Claims, 4 Drawing Sheets

METHOD AND APPARATUS FOR MEASURING PARAMETERS OF AN ELECTRICAL SYSTEM

CROSS-REFERENCE TO RELATED APPLICATIONS:

NOT APPLICABLE

STATEMENT REGARDING FEDERALLY FUNDED RESEARCH OR DEVELOPMENT

NOT APPLICABLE

INCORPORATION BY REFERENCE OF MATERIAL SUBMITTED ON A COMPACT DISC

NOT APPLICABLE

BACKGROUND OF THE INVENTION

1. Technical Field

The present invention relates to a method of and apparatus for measuring parameters of an electronic system by reference to an input series of data samples received and processed at a first data rate so as to produce in real-time at least first and second time-varying series of measurements for a given parameter. The invention may be applied in the measurement of timing errors in digital transmission systems, for example, standardised measurement known as Timing Deviation (TDEV) in Synchronous Digital Hierarchy (SDH) digital transmission systems in accordance with specifications as set out by the ITU-T ("ITU" stands for International Telecommunications Union).

2. Background Art

Modern telecommunications networks demand a high degree of synchronisation between network transmission elements. For all network transmission elements in SDH architectures timing is critical. However, as will be explained later, phase variations in the reference clock frequencies governing synchronous network elements may introduce errors at various stages in the network.

One measure of timing errors in synchronous digital transmission systems is known as the timing deviation and is derived from an ensemble of timing error samples. This is a measure of the time variation of a signal and can also provide information oh the noise signal. In SDH systems, the timing error samples are referred to as "Time Interval Error" or TIE samples, and a standardised timing deviation measure referred to as TDEV is defined. TDEV values, together with other parameters, are used to evaluate the performance of equipment and systems, often to diagnose a fault which has developed and which impairs customer service.

Unfortunately, implementing directly the definition of TDEV (or similar parameters) provided by the standards bodies does not permit a real-time display of the results. In particular, TDEV is generally required to be measured for on a set of different times (observation intervals), to reveal information about the time varying behaviour of the signal, and aid in diagnosis of faults. The observation intervals typically range from one second up to a day or more. To obtain the results for such intervals conventionally requires a large quantity of data to be collected and, in principle, even for the shortest observation interval, TDEV cannot be calculated until the entire data set has been gathered. This is clearly inconvenient but if, to obtain a quicker result, TDEV for the observation intervals is calculated using a partial set of data, the calculations performed must be performed again as more data becomes available. One proposal which provides intermediate results at an early stage is JP-A-10178420 (Anritsu) (Derwent Abstract accession number 98-424471/199836 refers).

An alternative expression of TDEV can be formulated, in the frequency domain. From this, it becomes possible to implement the calculations of TDEV for the different observation intervals as a bank of filters, each with its own band-pass characteristics. This offers a real-time implementation, in which estimates of the measurement for the shorter observation intervals become more quickly available. Short term problems may reveal themselves as the early results are replaced with new data. Results for longer observation intervals will become available as time progresses. One system which purports to offer real-time TDEV measurement on this basis is Flexacom Plus, advertised by ICT Electronics on the World Wide Web.

A problem which remains with the filter implementation is the large amount of data storage and computation needed to obtain the measured values of TDEV or the like, particularly for the longer observation intervals. The ITU-T specifies a minimum sample rate of 30 Hz, while samples covering at least three times the observation interval are generally required to obtain one measurement.

The invention aims to permit real-time calculation of a set of measurements such as TDEV for a range of observation intervals, while reducing the computational burden involved.

SUMMARY OF INVENTION

The invention in a first aspect provides a method of measuring parameters of an electronic system by reference to an input series of data samples (TIE) received and processed at a first data rate so as to produce in real-time at least first and second time-varying series of measurements for a given parameter (TDEV), each series of measurements resulting from the performance of a respective first and second process by digital data processing, the first and second series of measurements representing said parameter of the system nominally with regard to respective first and second observation intervals, the second observation interval being longer than the first, wherein:

the first process is implemented in real time by performing a first low pass filter process on said input series of data samples so as to produce a first low pass filtered series of data samples, and performing a first further process on said first low pass filtered series of samples to obtain the first series of measurements;

a first reduced rate series of samples is extracted from said first low pass filtered series of data samples; and the second process is performed in real time using said first reduced rate series of samples.

In the case of TDEV calculation, each of the first process and the second process comprises an appropriate band-pass filter function, followed by an RMS power estimation function. By performing the low-pass element of this separately, a filtered sample set is available, which can be used to provide a lower data rate input for the second band-pass filter. The reduction in the overall amount of calculation, when several TDEV intervals are being calculated at once, means that real-time calculation may be carried out economically [low cost Digital Signal Processor (DSP) solution built into a portable test instrument].

In a first embodiment of the invention a series of band-pass filter stages is implemented in parallel, one for each observation interval. Each stage (ignoring the last stage) is divided into low-pass and high-pass filters, and the low-pass filtered samples are used as the input to the subsequent stage. Since the input samples for each stage are pre-filtered in this way, the data set needed to estimate TDEV at different time intervals can be reduced without loss of information.

Various arrangements are possible, which can be chosen according to the exact observation intervals required, and the economics of a chosen implementation. For example, to implement the low-pass and high-pass functions separately is likely to be more costly than direct implementation of a band-pass function. Accordingly, in a second embodiment of the invention, the samples are not separately low-pass filtered and reduced at every stage, but only at certain key stages.

The invention further provides an apparatus for measuring parameters of an electronic system by reference to an input series of data samples received and processed at a first data rate so as to produce in real-time at least first and second time-varying series of measurements for a given parameter, each series of measurements resulting from the performance of a respective first and second process by digital data processing, the first and second series of measurements representing said parameter of the system nominally with regard to respective first and second observation intervals, the second observation interval being longer than the first, the apparatus comprising:

means for performing said first process in real-time by (i) performing a first low pass filter process on said input series data samples so as to produce a first low pass filtered series of data samples, and (ii) performing a first further process on said first low pass filtered series of samples to obtain the first series of measurements;

means for extracting a first reduced rate series of samples is extracted from said first low pass filtered series of data samples; and means for performing said second process in real time using said first reduced rate series of samples.

The first and second processes can conveniently be implemented in a single digital signal processor chip, although of course hard-wired filter arrangements could be used instead.

Further optional features are set forth in the dependent claims. These and other features, together with their advantages will be apparent to the skilled reader from the description of specific embodiments which follows.

It will be understood that "real time" in this context does not imply that results are available without delay, or must be strictly synchronised with the flow of input samples. "Real time" in this context signifies merely that input samples can be processed, on average, substantially at the rate at which the input samples are generated.

BRIEF DESCRIPTION OF THE DRAWINGS

Embodiments of the invention will now be described, by way of example only, with reference to the accompanying drawings, in which.

DETAILED DESCRIPTION OF DRAWINGS

Figure 1:
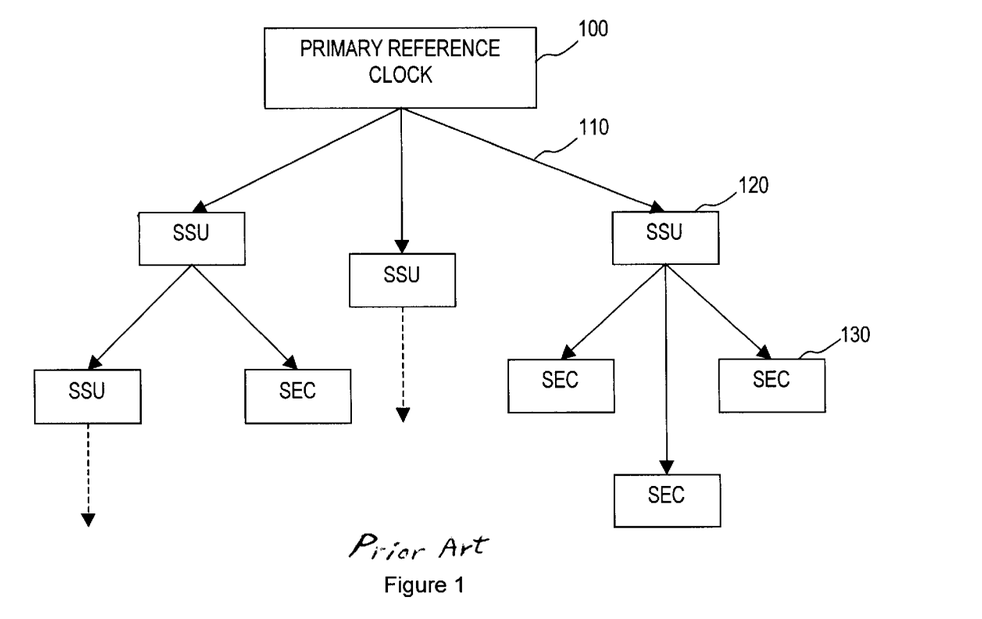
FIG. 1 is a block diagram representation of a synchronisation network.

FIG. 1 shows a simplified representation of a synchronisation network forming part of a telecommunications system. A Primary Reference Clock (PRC) 100 provides the reference frequency signal which controls the synchronisation network using a Master-Slave method. The PRC is typically a source such as a caesium oscillator capable of maintaining a high quality frequency signal in accordance with ITU-T specifications. The clock signal is distributed over an SDH medium 110 to Synchronisation Supply Units (SSUs) 120 which handle the processing, generation and further distribution through the network of timing information. The SSUs help minimise degradation of the synchronisation signal as it is transported across the network from node to node. Connected to the SSU node outputs are the various SDH network devices and switching nodes. The clock generator in a SDH network is known as a SDH Equipment Clock (SEC) 130.

Degradation of synchronisation in an SDH network may be due to several factors. Common causes include variations in propagation times in cabling and frequency drifts due to temperature changes in the PLLs used. Errors in synchronisation may also occur if an SSU or SEC operates out of the ideal locked mode and in hold-over or free-running modes. Any general re-configuration event in the synchronisation chain may give rise to transient events, as will a change of PRC in international links.

Variations in the timing signal may be broadly split into two categories. In the ITU specifications, short term variations which are of frequency greater than or equal to 10 Hz are referred to as "jitter". Longer term variations which are of frequency less than 10 Hz are referred to as "wander".

Since there are strict regulations governing timing it is necessary to have some means of measuring and identifying faults and errors. Three important measurements of network timing errors in the ITU recommendations are the Time Interval Error (TIE), Maximum TIE (MTIE), and Time Deviation (TDEV). Of principal interest for the present invention is TDEV, which is a measure of the time variation of a signal over a specific integration time (observation interval). TDEV is measured in units of time and is derived from a sequence of time error (TIE) samples.

A major benefit of studying TDEV behaviour is in the evaluation of noise behaviour. TDEV($\tau$) converges for all the major noise types affecting actual timing signals. A set of TDEV measurements for different observation intervals $\tau$ can provide very useful information the sources of noise in a signal. The characteristic slopes of TDEV($\tau$) indicate different noise types enabling the discrimination between, for example, White Phase Modulation (WPM) and Frequency Phase Modulation (FPM) noise types. The behaviour of TDEV($\tau$) significantly depends on observation period $\tau$ for observation intervals where the WPM noise dominates, significant in TDEV measurement systems. TDEV is also sensitive to other influences. Systematic effects, such as diurnal wander, may mask various noise components. Accordingly, TDEV measurements for observation intervals covering the range from 1 second to 10,000 seconds or even 100,000 seconds may be of interest. It is specified by the ITU-T Recommendation G.810 Appendix II.3 that TDEV ($n\tau_0$) should be estimated by:

$$TDEV(n\tau_0) \cong \sqrt{\frac{1}{6n^2(N-3n+1)} \sum_{j=1}^{N-3n+1} \left[ \sum_{i=j}^{n+j-1} (x_{i+2n} - 2x_{i+n} + x_i) \right]^2}$$

where x represents the series of timing error samples (TIE); $n\tau_0$ is the observation interval with $\tau_0$ the sampling period and n=1, 2, . . . , integer part N/3; and N is the number of TIE samples required to calculate TDEV for a given observation interval.

Implementing this definition directly, TDEV may be calculated by gathering timing error samples from the equipment or network over a long period of time (depending on the longest observation interval of interest). This data set would then be processed off-line, to obtain the best estimate for TDEV for each observation interval. Note that the estimate for even the shortest observation interval is to be calculated using the entire sample set.

The amount of data which needs to be gathered is very large and may take long periods of time to collect, often extending to days, with the analysis of the data a computationally intensive task, conducted off-line. At a sampling rate of 50 Hz, for example, the TIE samples will take approximately 100 kilobytes of memory space per minute and so even comparatively short observation periods will take up large amounts of memory and a corresponding amount of time and processing power is needed to derive meaningful results. The result of this approach is that both staff and equipment resources are tied up, and results are not normally available during the test period which makes identifying cause and effect in the system being studied difficult. Further, it may take days to gather data which, when processed, indicates a problem which would have been observable after only a few minutes. Although a smaller data set could be used to obtain a preliminary value of TDEV for a short observation interval, the results cannot then conveniently be updated as new data arrives, without re-processing the whole set, or storing a large number of intermediate results.

ITU-T Recommendation G.810 also mentions that TDEV is related to the power spectral density $S_\phi(f)$ of its random phase deviation $\phi(t)$ by the following integral relationship:

$$TDEV(\tau) = \sqrt{\frac{2}{3(\pi v_{nom} n)^2} \int_0^{f_h} S_\varphi(f) \frac{\sin^6(\pi n \tau_0 f)}{\sin^2(\pi \tau_0 f)} df}$$

where $v_{nom}$ is the nominal frequency of the timing signal; and $f_h$ is the measurement system bandwidth. The above relationship is equivalent to the conventional definition holds under the assumption that no deterministic components affect the time error data used to compute $TDEV(n\tau_0)$ but in practice the data may include deterministic effects.

This alternative form of expression permits a real-time implementation of the TDEV calculation, in which TDEV for each observation interval can be obtained by applying a band-pass filter function to the sequence of TIE samples. The pass band of the filter is selected appropriately for each observation interval. There is provided a method of carrying out a calculation in real-time which provides an estimate for each TDEV value, as soon as sufficient data becomes available. Leaving the test running for longer will allow TDEV values for longer observation intervals to be obtained, if desired, and values for shorter intervals to be updated. Short period problems can be diagnosed more quickly and the test terminated as soon as a problem is observed. However, for longer intervals, the amount of data to be processed in the filter (the number of samples and coefficients) is still very large indeed.

Figure 2:
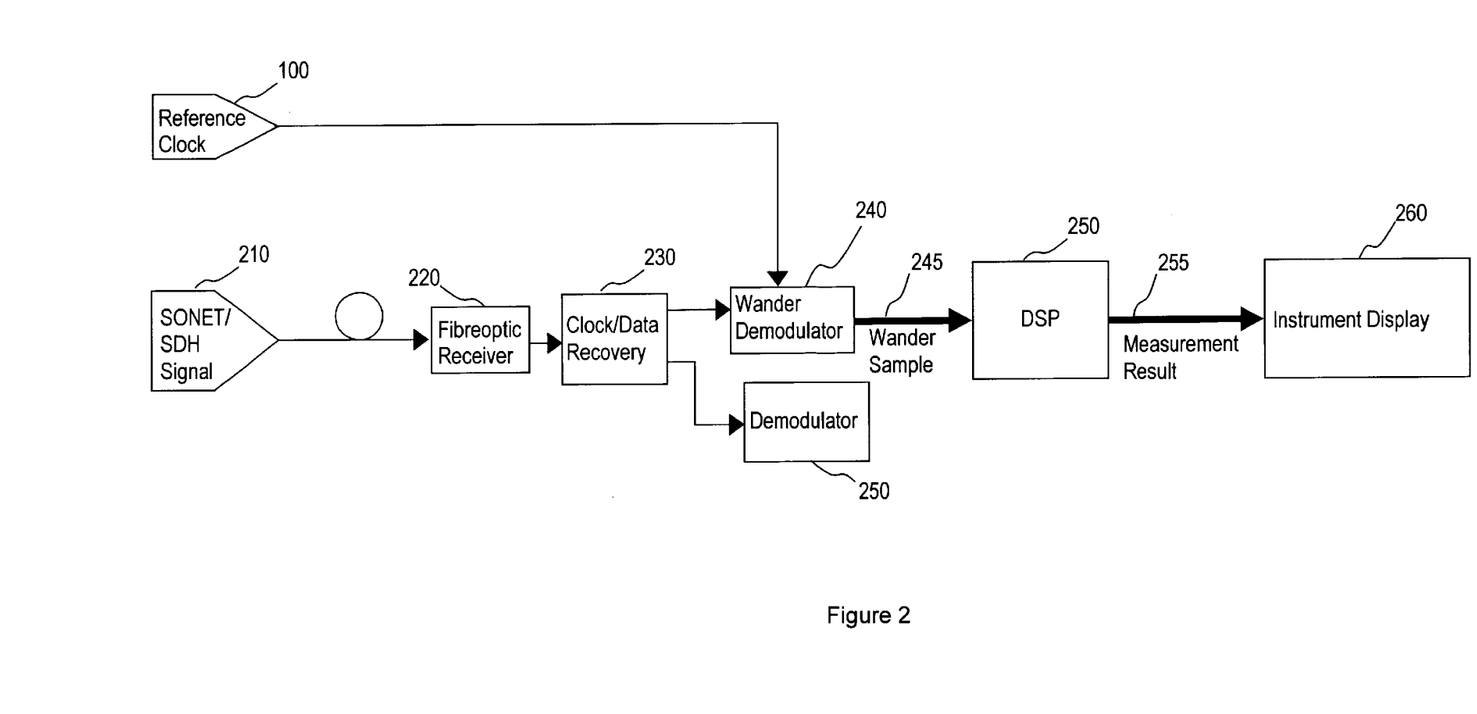
FIG. 2 is a top level block diagram of a measurement apparatus in accordance with the present invention.

FIG. 2 is a block diagram of the novel test measurement apparatus, insofar as is relevant to TDEV measurements. In practice, the same instrument will be capable of deriving various measurements from the system, not only TDEV. In this configuration an SDH signal 210 is fed into an interface block of the test equipment which consists of a fibre optic receiver 220 and a clock/data recovery module 230 which recovers the data timing signal for further processing by the wander demodulator 240. The data may be passed on to a further demodulator 250 for other uses. A reference clock 100 signal is obtained from an appropriate source to provide the necessary reference timing signal.

The wander demodulator 240 has the functional ability to obtain and output TIE samples (wander samples 245) by comparing the recovered data clock signal with the reference signal. To evaluate TDEV values the wander samples 245 are passed to a digital signal processor (DSP) 250. The results of processing are then recorded and/or passed at 255 to a display 260.

Various considerations for the definition and implementation of test instrumentation for measuring jitter, wander, TDEV, MTIE and the like in SDH are given in ITU-T recommendation O.172. The present apparatus is capable of measuring a clock signal at several STM-N bit rates in use by different systems. It should be noted that the invention is in no way limited to or by these clock frequencies. The actual clock signal may be derived by several methods from the reference clock source used. The clock signal frequency required may be synthesised by, for example, techniques using PLLs, clock multipliers and dividers. Direct digital synthesis may be utilised if the ratio of the clock signal required and the source reference clock is not suitable for these methods. These details of implementation will be within the capability of the skilled reader, and will not be discussed further herein.

In the present example, TIE is the basic function from which timing deviation TDEV, as well as other parameters, can be calculated. The wander demodulator 240 contains the necessary functionality needed to obtain TIE samples. Within demodulator 240, the test signal is first input into a phase detector which also takes as an input a reference timing signal derived from an external reference clock 100 signal as stated above. The output of this phase comparator is filtered through an equivalent 10 Hz first order, low pass filter, to separate the wander from the jitter, as defined.

The resulting TIE samples are output at 245 at a frequency of 50 Hz, which is significantly better than the minimum of 30 Hz recommended by the ITU-T in recommendation G.812/813. Measurement at this higher frequency safeguards against aliasing, when information is lost due to low sampling rates, but increases the amount of data to be processed. The accuracy of the wander measurement function is dependent on several factors including the TIE sampling interval, with serious errors occurring as the sampling interval lengthens. The invention described herein is not limited to this or any other single frequency.

In the present apparatus, the calculation of TDEV is carried out effectively as a frequency domain process, using a bank of filters as described above. However, the invention provides a novel and advantageous manner of using that basic principle, in particular in relation to the filtering. By way of comparison, the prior art technique as it would use a wander modulator and a DSP, is illustrated schematically in FIG. 3, where the TDEV value for one specific value of τ is shown. The TIE samples are passed to the DSP for the TDEV calculation. TDEV, as previously explained, is a measure of wander that is a function of parameter τ, the observation interval. TDEV(τ) can be said to be the Root Mean Square (RMS) of band pass filtered TIE samples, the pass band of the filter corresponding to the desired observation interval. Within the DSP, the TIE samples 300 derived from the wander demodulator are effectively passed to a band pass filter 310, the band pass filter function 340 centred on a frequency of 0.42/τ. The RMS measurement 320 value for the filtered result gives the TDEV(τ) 330 value. Band pass filters with other values for τ will result in other TDEV values for other observation intervals.

Figure 3:
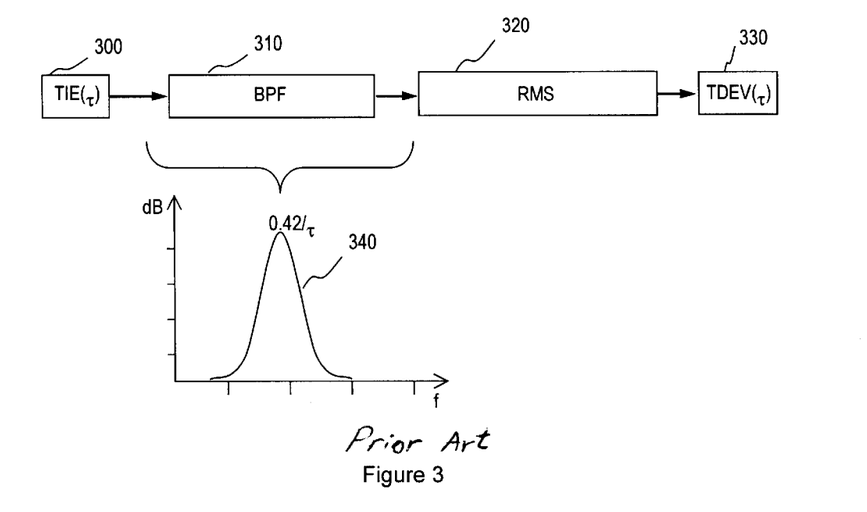
FIG. 3 illustrates the principles of TDEV measurement process using band pass filters.

Since a large of amount of raw data is generated in this process, in order to make real-time TDEV calculation more economic the computation effort required of the filter and RMS stages are reduced in the novel arrangement. This is achieved through implementing the band pass filters, or at least certain of them, as a cascade of low- and high-pass filters. At the output of each low-pass filter, a reduced rate series of samples can be taken. For use as the input to the measurement of TDEV for a longer observation intervals. As a result, the storage and computational requirements for the longer-term measurement can be greatly reduced, with only modest increase in the computational burden for the shorter-term measurement.

Figure 4:
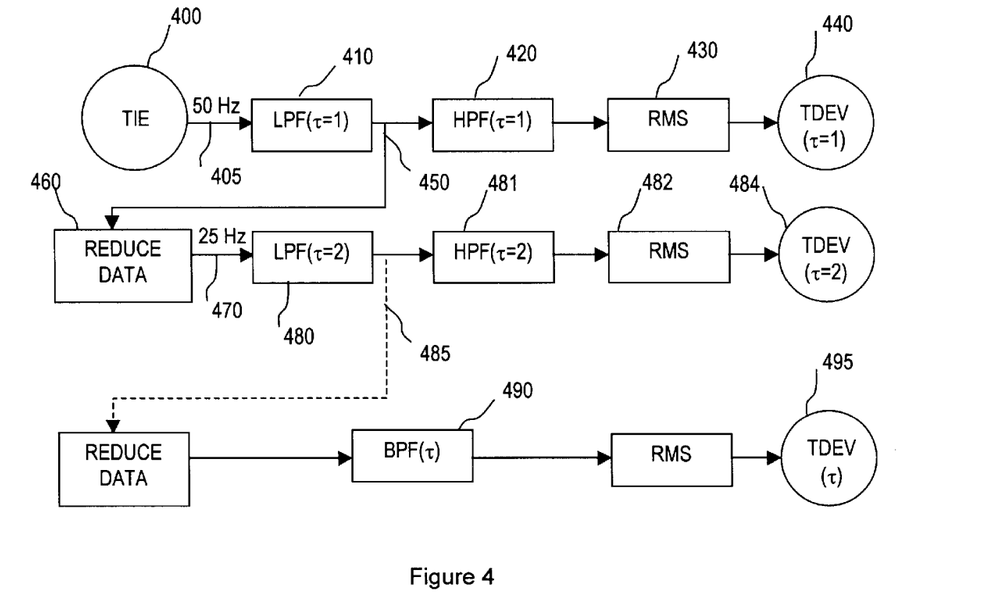
FIG. 4 is a functional block diagram showing the processing implemented in the apparatus of FIG. 2 to measure TDEV in a first embodiment of the invention.
Figure 5:
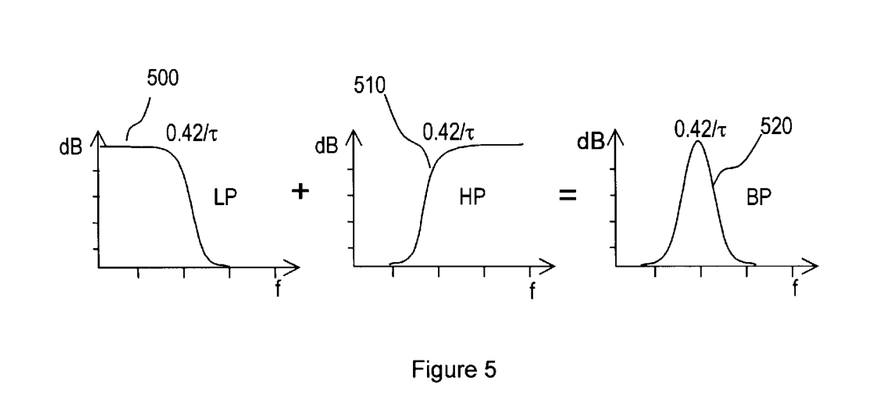
FIG. 5 illustrates the combination of low and high pass filter functions to give a band pass function.

FIG. 4 illustrates this TDEV calculation process, implemented by DSP 250, for a first embodiment in block diagram form, showing the data flow through the filter and RMS stages and the process of decimation. The TIE data 400, sampled in the first instance at 50 Hz 405, passes through a low pass filter 410 first, thus eliminating high-frequency signal components, above the desired pass band. The low pass filtered data is then processed through a high pass filter 420 so that now the TIE samples are fully band pass filtered. An RMS calculator 430 estimates the RMS value of the filtered TIE data, thus outputting the TDEV value 440 for this value of $\tau$, where here $\tau=1$ second. The filter responses used to build up the band pass functions are shown schematically in FIG. 5, showing how the low pass 500 and high pass 510 filter functions combine to give a band pass filter function 520.

For the calculation of TDEV values for longer observation intervals ($\tau=2$ seconds etc), the original data at 405 is not used. Instead the low pass filtered data is tapped at 450 and fed to a reduction (decimation) process 460, sampled at half the previous frequency (25 Hz) and passed on to second low pass filter 480 in the filter cascade. The second low pass filter 480 eliminates high frequency components appropriate to the calculation of TDEV for $\tau=2$ seconds. Since the data at 450 is already filtered with a cut-off well below 12 Hz, the Nyquist sampling criterion confirms that no information is lost, while the quantity of data is halved.

As before, a high pass filter 481 completes the filtering process and an RMS calculator 481 outputs the TDEV value for $\tau=2$ s. By using the reduced rate data, it will be appreciated that that the amount of data to be processed, the filter size and even the coefficients themselves are no different for the longer interval $\tau=2$ s than for the shorter interval $\tau=2$ s.

This process of data reduction continues down the stages, where TDEV for longer and longer observation intervals is measured. As a result, subsequent filters need to perform less calculation than conventionally, allowing for fast calculation to be carried out. Each stage of the cascade shown in this case samples at half the frequency of the previous stage. Conveniently, although this is not necessarily the case, each stage outputs a TDEV value corresponding to a time interval twice that of the previous stage (in other words increasing in octaves). It will be understood that only a few representative stages are shown, and more will be provided in practice. For example, fourteen octave stages will be needed to reach an observation interval of 16384 seconds. For the final stage of the cascade there is no need for a separate low and high pass filter so a band pass filter 490 may be substituted instead, the sampled data processed as before to give a final TDEV value 495.

The advantage gained by using this method allows for the real-time display of TDEV characteristics with a high degree of speed and accuracy which cannot be achieved with time domain based methods. Each of the filter elements, including the decimation process and the RMS calculation, can be derived using standard DSP techniques and do not involve complex calculations. The RMS and high pass/band pass filter stages can be implemented in a single composite filter process, with appropriate poles and zeroes. Other frequency ratios may be used as desired, although simple octaves are particularly easy to implement.

Figure 6:
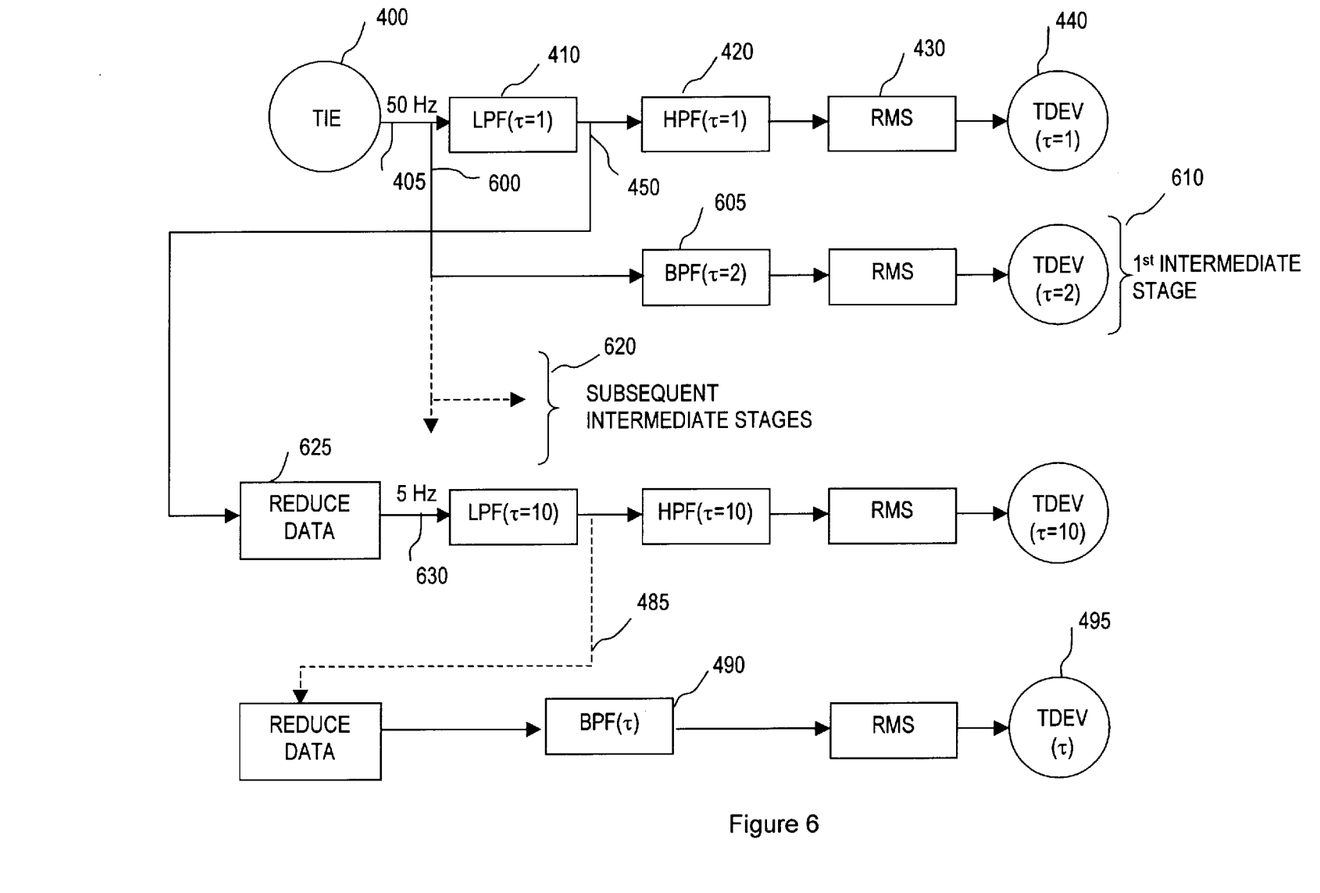
FIG. 6 is a functional block diagram showing the processing implemented in the apparatus of FIG. 2 to measure TDEV in a second embodiment of the present invention.

FIG. 6 shows another embodiment of the invention which adds intermediate stages 610, 620 to the decimation process of that shown in FIG. 5. The data sampled at 50 Hz 405 is processed in the same manner as that detailed before and shown schematically in FIG. 4. However, the number of low pass filter and data reduction stages does not have to match the number of TDEV observation intervals required. Successive stages in the main cascade may thus have sampling frequencies set at considerably greater ratios than that previously described, enhancing the data reduction process. In the example of FIG. 6, the reduction at 625 is by a factor ten at each main stage, so that the second stage of the main cascade samples the TIE data at 5 Hz. The intermediate stages may for example correspond to observation intervals $\tau=2, 3, 4 \ldots 9$ seconds. The same pattern of intermediate stages may be repeated at each decade, up to the maximum observation interval of interest.

The intermediate stages 610, 620 in this example all sample at the same frequency as the preceding main stage. Where there is no need for further data decimation at the intermediate stages these stages are implemented as single stage band pass filters 605 instead of low pass/high pass filter pairs. Each filter 605 etc will have coefficients set to give a value for TDEV appropriate to the desired observation interval. This embodiment enables a close spacing of observation intervals to be obtained, without the overhead of a separate low pass filter stage at every one. In principle, "nesting" of data-reduction stages could be implemented, if justified in a particular case. For example reduction by octaves (2, 4, 8; 20, 40, 80 etc) could be nested within reduction by decades (1, 10, 100 etc)

The use of DSP techniques to implement the filter cascades has numerous advantages, including integration of the various functional elements at different stages needed to process the raw data to produce the TDEV results. Specialised hardware is used in the present apparatus for various blocks before the DSP device, for example the clock and data recovery block 230 and the wander demodulator 240. In other implementations, the DSP could carry out some of these functions, too. In particular, the wander demodulation could be integrated into the DSP system as it would eliminate the need to transfer sample values for the MTIE/TDEV calculations. The generation of a reference timing signal would remain an external function, with the phase detector and measurement filters being implemented in the DSP. In such an implementation the same device could therefore be used for the MTIE, TDEV and wander demodulation functions giving the advantage of multiple functionality simply by programming changes.

An advantageous feature of real time TDEV measurement not possible with previous static, off-line processing solutions is that transient phenomena may be studied in detail. Due to the stochastic nature of the calculation of TDEV in stored data processing systems transient phenomena cannot be observed in any detail. Such phenomena may include any non-stochastic event, either completely random in nature or deterministic and periodic. This would allow the observation of systematic errors and phase transients on the networks or equipment under test, for instance due to reference switching.

The skilled reader will appreciate that the invention is not limited to the specific implementations and applications detailed above. It can be applied to the measurement of standardised and non-standardised parameters other than TDEV, and in electronic systems other than SDH telecommunication networks. It can be implemented in various combinations of hardware and software, and with or without hard-wired or programmable circuits. In particular, the dedicated DSP unit 250 and display 260 of FIG. 2 would be replaced by a single general purpose computer for example a notebook PC connected to the instrument hardware. The entire process of FIG. 4 or 6 might then be implemented by software signal processing.

What is claimed is:

1. A method of measuring parameters of an electronic system by reference to an input series of data samples received and processed at a first data rate so as to produce in real-time at least first and second time-varying series of measurements for a given parameter, each series of measurements resulting from the performance of a respective first and second process by digital data processing, the first and second series of measurements representing said parameter of the system nominally with regard to respective first and second observation intervals, the second observation interval being longer than the first, wherein:

the first process is implemented in real time by (i) performing a first low pass filter process on said input series of data samples so as to produce a first low pass filtered series of data samples, and (ii) performing a first further process on said first low pass filtered series of samples to obtain the first series of measurements;

a first reduced rate series of samples is extracted from said first low pass filtered series of data samples; and the second process is performed in real time using said first reduced rate series of samples.

2. A method as claimed in claim 1 wherein at least one first intermediate series of measurements is produced by a first intermediate process, the first intermediate series of measurements representing said parameter with regard nominally to a first intermediate observation interval, intermediate between the first and second observation intervals, said first intermediate process being applied to said input series of samples in order to obtain said first intermediate series of measurements.

3. A method as claimed in claim 1 wherein a plurality of intermediate series of measurements are performed by respective intermediate processes, the first plurality of intermediate series of measurements representing said parameter with regard nominally to respective intermediate observation intervals, intermediate between the first and second observation intervals, each said intermediate process being applied to said input series of samples in order to obtain the respective intermediate series of measurements.

4. A method as claimed in claim 1 wherein said first reduced rate is related to the first data rate by factor which is one of two, four and eight.

5. A method as claimed in claim 1 wherein said first reduced rate is related to the first data rate by a factor ten.

6. A method as claimed in claim 1 wherein the first low pass filter process implements a low pass filter function having a nominal cut-off frequency less than one twentieth the sampling frequency of said input series of data samples.

7. A method as claimed in claim 1 wherein a third series of measurements is produced by a third process, the third series of measurements representing said parameter with regard nominally to a third observation interval, longer than the first and second observation intervals, wherein:

said second process is implemented by (i) performing a second low pass filter process on said first reduced rate series of samples so as to produce a second low pass filtered series of data samples, and (ii) performing a second further process on said second low pass filtered series of samples to obtain the second series of measurements;

a second reduced rate series of samples is extracted from said second low pass filtered series of data samples; and the third process is performed in real time using said second reduced rate series of samples so as to produce said third series of measurements.

8. A method as claimed in claim 7 wherein at least one second intermediate series of measurements is produced by a second intermediate process, the second intermediate series of measurements representing said parameter with regard nominally to a second intermediate observation interval, intermediate between the second and third observation intervals, said second intermediate process being applied to said second low pass filtered series of data samples in order to obtain said second intermediate series of measurements.

9. A method as claimed in claim 1 wherein said input series of data samples is obtained by (i) performing in real time a prior low pass filter process so as to produce a prior low pass filtered series of data samples at a higher rate than said first data rate and (ii) extracting said input series from said prior low pass filtered series of samples, said prior low pass filter process being performed in real time as part of a prior process to obtain a prior series of measurements, the prior series of measurements representing said parameter with regard nominally to a prior observation interval shorter than the first observation interval.

10. A method as claimed in claim 1 wherein each of the processes for obtaining respective series of measurements implements a band pass filter function.

11. A method as claimed in claim 10 wherein each of said processes further implements a power estimation function.

12. A method as claimed in claim 11 wherein said power estimation function is an RMS (root mean square) estimation function.

13. A method as claimed in claim 11 wherein in the implementation of at least one of said processes a composite filter process is used whose transfer function is the product of at least a part of said band pass filter function and said power estimation function.

14. A method as claimed in claim 13 wherein in the implementation of said first further process a composite filter process is used whose transfer function is the product of a first high pass filter function and said power estimation function, such that said band pass filter function and power estimation function are implemented by the-combination of said first low pass filter process followed by said first further process.

15. A method as claimed in claim 1, wherein the electronic system comprises part of a synchronous telecommunications network, and wherein the input data samples represent successive measured timing errors between a signal in the system and a timing reference.

16. A method as claimed in claim 15 wherein said timing reference is derived from a signal at another part of the network.

17. A method as claimed in claim 15 wherein said input series of samples represents wander in said timing errors, and is produced in real time by applying a low pass filter process with predetermined cut-off frequency to said timing errors.

18. An apparatus for measuring parameters of an electronic system by reference to an input series of data samples received and processed at a first data rate so as to produce in real-time at least first and second time-varying series of measurements for a given parameter, each series of measurements resulting from the performance of a respective first and second process by digital data processing, the first and second series of measurements representing said parameter of the system nominally with regard to respective first and second observation intervals, the second observation interval being longer than the first, the apparatus comprising:

means for performing said first process in real-time by (i) performing a first low pass filter process on said input series of data samples so as to produce a first low pass filtered series of data samples, and (ii) performing a first further process on said first low pass filtered series of samples to obtain the first series of measurements;

means for extracting a first reduced rate series of samples from said first low pass filtered series of data samples; and means for performing said second process in real time using said first reduced rate series of samples.

19. An apparatus as claimed in claim 18 further comprising means for producing at least one first intermediate series of measurements by performing a first intermediate process, the first intermediate series of measurements representing said parameter with regard nominally to a first intermediate observation interval, intermediate between the first and second observation intervals, said first intermediate process being applied to said input series of samples in order to obtain said first intermediate series of measurements.

20. An apparatus as claimed in claim 18 further comprising means for producing a plurality of intermediate series of measurements by performing respective intermediate processes, the first plurality of intermediate series of measurements representing said parameter with regard nominally to respective intermediate observation intervals, intermediate between the first and second observation intervals, each said intermediate process being applied to said input series of samples in order to obtain the respective intermediate series of measurements.

21. An apparatus as claimed in claim 18 wherein said first reduced rate is related to the first data rate by factor which is one of two, four and eight.

22. An apparatus as claimed in claim 18 wherein said first reduced rate is related to the first data rate by a factor ten.

23. An apparatus as claimed in claim 18 wherein the means for performing said first low pass filter process is arranged to do so by implementing a low pass filter function having a nominal cut-off frequency less than one twentieth the sampling frequency of said input series of data samples.

24. An apparatus as claimed in claim 18 further comprising means for producing a third series of measurements by performing a third process, the third series of measurements representing said parameter with regard nominally to a third observation interval, longer than the first and second observation intervals, the means for performing said second and third processes being arranged so that in operation:

the second process is implemented by (i) performing a second low pass filter process on said first reduced rate series of samples so as to produce a second low pass filtered series of data samples, and (ii) performing a second further process on said second low pass filtered series of samples to obtain the second series of measurements;

a second reduced rate series of samples is extracted from said second low pass filtered series of data samples; and the third process is performed in real time using said second reduced rate series of samples so as to produce said third series of measurements.

25. An apparatus as claimed in claim 24 further comprising means for producing at least one second intermediate series of measurements by performing a second intermediate process, the second intermediate series of measurements representing said parameter with regard nominally to a second intermediate observation interval, intermediate between the second and third observation intervals, said second intermediate process being applied to said second low pass filtered series of data samples in order to obtain said second intermediate series of measurements.

26. An apparatus as claimed in claim 18 further including means for obtaining said input series of data samples by (i) performing in real time a prior low pass filter process on samples received at a higher rate than said first data rate so as to produce a prior low pass filtered series of data samples at said higher rate and (ii) extracting said input series from said prior low pass filtered series of samples, said prior low pass filter process being performed in real time as part of a prior process to obtain a prior series of measurements, the prior series of measurements representing said parameter with regard nominally to a prior observation interval shorter than the first observation interval.

27. An apparatus as claimed in claim 18 wherein the means for performing each of said first, second and, where provided, third processes for obtaining respective series of measurements is arranged to do so by implementing a band pass filter function.

28. An apparatus as claimed in claim 27 wherein the means for performing each of said first, second and, where provided, third processes for obtaining respective series of measurements is arranged to do so by further implementing a power estimation function.

29. An apparatus as claimed in claim 28 wherein said power estimation function is an RMS (root mean square) estimation function.

30. An apparatus as claimed in claim 28 wherein the means for performing at least one of said first, second and third processes is arranged to do so using a composite filter process whose transfer function is the product of at least a part of said band pass filter function and said power estimation function.

31. An apparatus as claimed in claim 30 wherein in the means for performing said first further process is arranged to do so using a composite filter process whose transfer function is the product of a first high pass filter function and said power estimation function, such that said band pass filter function and power estimation function will be implemented by the combination of said first low pass filter process followed by said first further process.

32. An apparatus as claimed in claim 18 further comprising means (23, 240) for obtaining said input series of data samples by successively measuring timing errors between a signal in part of a synchronous telecommunications network and a timing reference.

33. An apparatus as claimed in claim 32 wherein said input series of data samples represents wander in said timing errors, and is produced in real time by applying a low pass filter process with predetermined cut-off frequency to said timing errors.

34. An apparatus as claimed in claim 24 wherein the means for performing said first, second and third processes comprise a programmed digital signal processor (250).

* * * * *